3,364,263
TRIS(DIFLUORAMINOMETHYL)AMINE AND PROCESS OF PREPARATION
James Brown Parker, Kilwinning, Scotland, assignor, by mesne assignments, to the United States of America as represented by the Secretary of the Navy
No Drawing. Filed Mar. 10, 1965, Ser. No. 440,065
Claims priority, application Great Britain, Apr. 1, 1964, 13,514/64; May 28, 1964, 22,196/64
10 Claims. (Cl. 260—583)

This invention relates to a new compound useful as a constituent of propellent explosives and to processes for the preparation of this compound.

The compound of the invention is tris(difluoraminomethyl)amine, $N(CH_2NF_2)_3$. It is useful as a monopropellent or as a constituent of propellent compositions wherein, for example, it may be used in admixture with such propellent constituents as ammonium perchlorate and aluminium. As a monorepellent it has a specific impulse of 287 as compared to a specific impulse of 185 for isopropyl nitrate.

In accordance with one process of the invention this compound is prepared by reacting difluoramine with a compound having a nitrogen atom directly bonded to three methylene groups in presence of an acid catalyst.

The compound containing the nitrogen atom directly bonded to three methylene groups may conveniently be a N-substituted pentamethylenetetramine derivative such as, for example dinitro- or dichloro-pentamethylenetetramine, or hexamethylenetetramine or an acid addition salt thereof such as, for example, hexamethylenetetramine dinitrate.

The reaction should preferably be carried out in a liquid dispersing or solvent medium which is substantially unreactive with the reactants. Suitable liquids for this purpose include methanol, difluoraminomethanol and methylene chloride.

The preferred acid catalyst is concentrated sulphuric acid.

In accordance with a further process of the invention tris(difluoraminomethyl)amine is prepared by reacting difluoraminomethanol with ammonia, an ammonium salt or sulphamic acid. Preferably the reaction is carried out in presence of a catalytic quantity of sulphuric acid or halogenosulphonic acid such as, for example, chlorosulphonic acid. With sulphamic acid and ammonium sulphate, sulphuric acid is formed in the reaction and the reaction takes place rapidly and a good yield is obtained without additional catalyst.

The reactions of difluoraminomethanol with ammonia and sulphamic acid respectively may be represented as follows:

(1)    $NH_3 + 3NF_2CH_2OH \rightarrow N(CH_2NF_2)_3 + 3H_2O$ (2)    $NH_2SO_3H + 3NF_2CH_2OH \rightarrow$
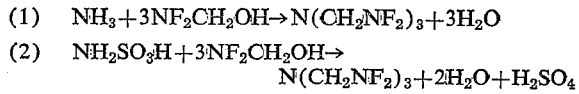
$N(CH_2NF_2)_3 + 2H_2O + H_2SO_4$ The difluoraminomethanol may be added as such to the reaction mixture but it is generally more convenient to prepare it in situ from difluoramine and formaldehyde.

The invention is further illustrated by the following examples in which all parts and percentages are by weight.

*Example 1*

4 parts of difluoramine, generated by the acid hydrolysis of aqueous N,N-difluorourea solution using 4 N sulphuric acid, were refluxed at −80° C. for 6 hours on to a mixture of 0.8 part of dinitropentamethylenetetramine and 1.35 parts of difluoraminomethanol. 5 parts of 96% sulphuric acid were then added dropwise to the mixture and difluoramine reflux continued for a further 2 hours. Excess difluoramine was allowed to vent off in a slow stream of nitrogen and the reaction mixture poured over 100 parts of crushed ice. The aqueous solution was extracted 5 times with 10 parts of diethyl ether and the ethereal extract dried for 24 hours over anhydrous sodium sulphate. Removal of the ether at room temperature gave 0.95 part of a yellow-green liquid.

Distillation of this liquid under vacuum gave 0.7 part of a colourless liquid boiling at 41.5–42.0° C. at 1.3 mm. and 166° C. at 760 mm. Elemental analysis of the distilled product gave 17.2% carbon, 2.9% hydrogen, 26.5% nitrogen and 53.5% fluorine. The molecular weight (cryoscopic in benzene) was 234. This(difluoraminomethyl)amine, $N(CH_2NF_2)_3$ requires 17.0% carbon, 2.8% hydrogen, 26.4% nitrogen, 53.2% fluorine and a molecular weight of 212. Gas-liquid chromatography showed the product to be pure (i.e. only 1 peak was obtained).

The product was miscible with benzene, ether, methylene chloride and ethanol but was immiscible with water. It flashed very brightly when ignited. When a ½ kg. mild steel hammer was dropped on to a drop of the liquid product on a mild steel anvil from a height of 20 cm., the liquid detonated but did not detonate when the fall height was 10 cm.

*Example 2*

4 parts of difluoramine were refluxed for 4 hours at −78° C. on to a suspension of 1 part of dinitropentamethylenetetramine in 10 parts of methylene chloride. 7 parts of 96% sulphuric acid were then added and difluoramine reflux continued for a further 4 hours. During addition of the acid, vigorous effervescence took place in the reaction flask. At the end of the difluoramine reflux, two liquid layers remained. Excess difluoramine was allowed to vent off and the two layer system poured on to 100 parts of crushed ice. A lower layer was separated and the upper aqueous layer extracted with 5×10 parts of methylene chloride. The lower layer, together with the methylene chloride extract, was dried over anhydrous sodium sulphate. The methylene chloride was evaporated from the residual solution at atmospheric pressure under an atmosphere of nitrogen to give a yellow-green liquid. Distillation of this crude material under vacuum gave 0.5 part of a clear, colourless liquid, the infra-red spectrum of which was identical to that of the product obtained in Example 1. Elemental analysis of this liquid gave 17.2% carbon, 3.2% hydrogen, 26.7% nitrogen and 53.6% fluorine.

*Example 3*

A suspension of 1 part of hexamethylenetetramine in 10 parts of methylene chloride was treated with 4 parts of difluoramine and 7 parts of 96% sulphuric acid as described in Example 2. Treatment of the residual reaction mixture as described in Example 2 gave 0.2 part of a clear, colourless liquid, the infra-red spectrum and analysis of which was the same as that of the product obtained in Example 1.

*Example 4*

A suspension of 1 part of hexamethylenetetramine dinitrate in 10 parts of methylene chloride was treated with 4 parts of difluoramine and 7 parts of 96% sulphuric acid as described in Example 2. Treatment of the residual reaction mixture as described in Example 2 gave 0.3 part of a clear, colourless liquid, the infra-red spectrum of which was similar to that of the product obtained in Example 1.

*Example 5*

A suspension of 1 part of hexamethylenetetramine dinitrate in 10 parts methanol was treated with 4 parts difluoramine and 7 parts of 96% sulphuric acid as described in Example 2. Treatment of the residual reaction mixture as in Example 2 gave 0.3 part of a clear, colourless liquid which had the same infra-red spectrum and analysis as the product of Example 1.

*Example 6*

A suspension of 1 part dichloropentamethylene tetramine in 1.5 parts of difluoraminomethanol was treated with 4 parts of difluoramine and 4 parts of 96% sulphuric acid as catalyst as described in Example 1. Treatment of the residual reaction mixture as described in Example 1 gave 0.6 part of a clear, colourless liquid, the boiling point and infra-red spectrum of which were similar to that of the product obtained in Example 1.

*Example 7*

0.5 part of ammonia were condensed into a reaction flask cooled to −80° C. and 4.8 parts of aqueous 37% formaldehyde solution were added. 4 parts of difluoramine were then refluxed at −80° C. on to the mixture in the flask for 3 hours. During the period of difluoramine reflux the reaction flask was allowed to warm up slowly to −23° C. 7.0 parts of 96% sulphuric acid were added dropwise to the reaction flask and difluoramine reflux continued for a further 4 hours. Excess difluoramine was then allowed to vent off and the reaction mixture poured on to 40 parts of crushed ice. The mixture formed two layers which were separated. The upper aqueous layer was extracted with 3×10 parts of methylene chloride and the extracts were added to the lower layer. The resulting solution was dried over anhydrous sodium sulphate and then the methylene chloride was removed in a stream of nitrogen, leaving a slightly yellow, oily liquid. Fractional distillation of this liquid gave 0.8 part of a clear, colourless liquid having a boiling point of 41.5° C. at a pressure of 1.4 mm. Hg. The infra-red spectrum of the liquid was identical to that of tris(difluoraminomethyl) amine, as obtained in Example 1.

*Example 8*

4 parts of difluoramine were refluxed at −80° C. for 2 hours on to a solution of 1.5 parts of sulphamic acid in 3.4 parts of aqueous 37% formaldehyde solution. During the period of difluoramine reflux a second layer formed in the reaction flask. After excess difluoramine had been allowed to vent off the product mixture was poured on to 40 parts of crushed ice. The mixture formed two layers which were separated. The upper aqueous layer was extracted with 3×10 parts of methylene chloride and the extracts were added to the lower layer and this solution was dried over anhydrous sodium sulphate. The methylene chloride was removed under slightly reduced pressure leaving a colourless liquid. Fractional distillation of this oil gave 1.1 parts of a clear, colourless liquid, the infra-red spectrum of which was identical to that of tris-(difluoraminomethyl)amine, as obtained in Example 1.

*Example 9*

In this example the procedure as described in Example 1 was followed except that 7.0 parts of chlorosulphonic acid were used instead of 5.0 parts of sulphuric acid. 0.6 part of tris(difluoraminomethyl)amine were obtained.

*Example 10*

4 parts of difluoramine were refluxed for 4 hours at −80° C. on to a solution of 1.3 parts of ammonium sulphate in 4.1 parts of 37% aqueous formaldehyde solution. Excess difluoramine was allowed to vent off in a stream of nitrogen overnight. The reaction mixture separated into two liquid layers. The lower layer was removed, washed quickly with water and then distilled under reduced pressure to give 1.1 parts of a clear, colourless liquid which was identified by its infra-red spectrum as tris(difluoraminomethyl) amine.

*Example 11*

4 parts of difluoramine were refluxed for 4 hours on to a mixture of 1.0 part of ammonium chloride and 4.8 parts of 37% aqueous formaldehyde solution. After excess difluoramine had been allowed to vent off in a stream of nitrogen the reaction mixture was poured on to 40 parts of crushed ice. Two liquid layers formed and were separated. The upper aqueous layer was extracted with 4×10 parts of diethyl ether and these extracts combined with the lower layer. After drying over anhydrous sodium sulphate, the ether was removed in a stream of nitrogen, leaving 1.0 part of a colourless liquid. The infra-red spectrum of this liquid was identical to that of tris(difluoraminomethyl) amine.

What we claim is:

1. The compound tris(difluoraminomethyl)amine.

2. A process for the preparation of tris(difluoraminomethyl)amine, which comprises reacting difluoramine with a compound having a nitrogen atom directly bonded to three methylene groups in presence of an acid catalyst, said compound being selected from the group consisting of hexamethylenetetramine, hexamethylenetetramine dinitrate, dinitropentamethylenetetramine and dichloropentamethylenetetramine.

3. A process as claimed in claim 2 wherein the catalyst is concentrated sulphuric acid.

4. A process as claimed in claim 2 wherein the reaction is carried out in a liquid medium which is substantially unreactive with the reactants.

5. A process as claimed in claim 4 wherein the medium is a compound selected from the group consisting of methanol, difluoraminomethanol or methylene chloride.

6. A process for the preparation of tris(difluoraminomethyl)amine, which comprises reacting difluoraminomethanol with ammonia, an ammonium salt or sulphamic acid.

7. A process as claimed in claim 6 wherein the ammonium salt is ammonium sulphate or ammonium chloride.

8. A process as claimed in claim 6 wherein the difluoraminoethanol is prepared in situ from difluoramine and formaldehyde.

9. A process as claimed in claim 6 wherein the reaction is carried out in presence of a catalytic quantity of an acid selected from the group consisting of sulphuric acid and a halogenosulphonic acid.

10. A process as claimed in claim 9 wherein the halogenosulphonic acid is chlorosulphonic acid.

References Cited

UNITED STATES PATENTS 3,166,595    1/1965    Frazer _____ 260—583

CHARLES B. PARKER, *Primary Examiner.*

REUBEN EPSTEIN, BENJAMIN R. PADGETT,
*Examiners.*

L. A. SEBASTIAN, R. L. RAYMOND,
*Assistant Examiners.*